UNITED STATES PATENT OFFICE.

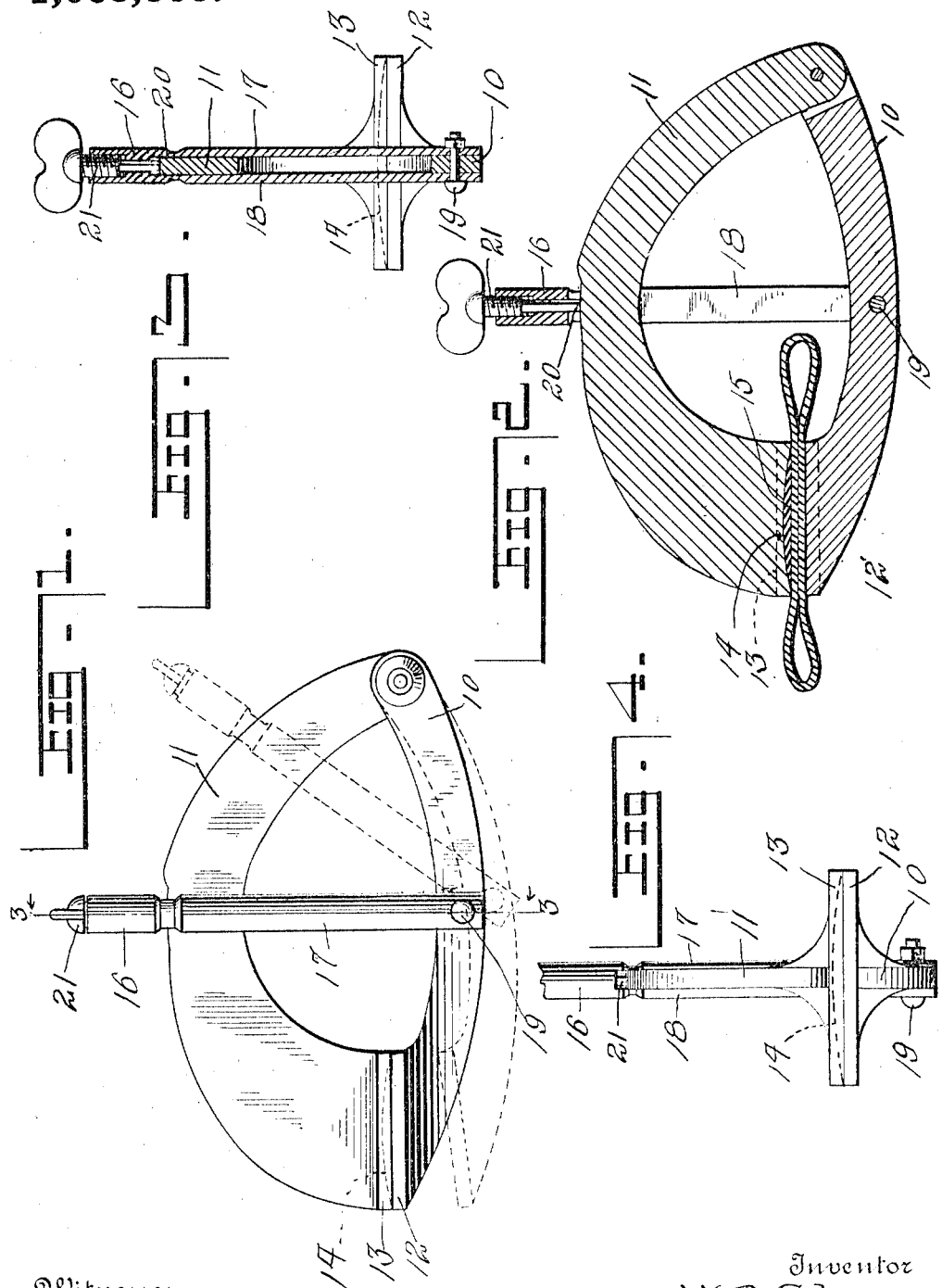

WILLIAM O. SHAW, OF ST. PAUL, MINNESOTA.

TIRE-PATCHING TOOL.

1,063,838.  Specification of Letters Patent.  Patented June 3, 1913.

Application filed January 22, 1913. Serial No. 743,690.

*To all whom it may concern:*

Be it known that I, WILLIAM O. SHAW, a citizen of the United States, residing at St. Paul, in the county of Ramsey, State of Minnesota, have invented certain new and useful Improvements in Tire-Patching Tools; and I do hereby declare the following to be a full, clear, and exact description of the invention, such as will enable others skilled in the art to which it appertains to make and use the same.

This invention relates to tire patching tools.

The object of the invention resides in the provision of a tool of the character named which will efficiently hold the patch to the inner tube of a tire throughout the entire extent of the patch while the securing cement is setting.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of the tool with the parts in clamping position in full lines and release position in dotted lines; Fig. 2, a vertical section of the tool showing same operatively applied to secure a patch to an inner tube; Fig. 3, a section on the line 3 3—of Fig. 1, and Fig. 4, a front view of what is shown in Fig. 1.

Referring to the drawings the tool is shown as comprising pivotally connected curved arms 10 and 11, the latter arm having a greater curvature than the former. The free ends of these arms 10 and 11 terminate respectively in enlarged portions forming coöperating clamping plates 12 and 13 respectively, the plate 13 having its active face concaved or dished as at 14 so as to receive the patch indicated at 15 and properly allow for the varying thickness of the patch. The means for locking the plates 12 and 13 in clamping relation is shown as comprising a yoke including a tubular stem 16 which terminates at one end in spaced arms 17 and 18. These arms 17 and 18 embrace both the arm 10 and the arm 11 and are pivotally connected to the former as at 19. The inner portion of the outer edge of the arm 11 is disposed in a curve of a circle whose center is between the free end of the arm 10 and the pivot 19, while the outer portion of said outer edge of the arm 11 is disposed in a curve of a circle whose center is between the inner end of the arm 10 and the pivot 19 with the result that a notch or depression 20 is formed substantially at the center of the outer edge of the arm 11.

In applying the tool the desired inner tube and patch is placed upon the plate 12 and the yoke is swung from the position shown in dotted lines in Fig. 1 to the position shown in full lines. During this movement of the yoke the plates 13 and 14 will be forced together to clamp the inner tube and patch. Before the set screw 21 can be operated the inner tube and patch will tend to throw the plates 12 and 13 apart but owing to the curvature of the outer edge of the arm 11 the yoke will be prevented from moving from the position shown in full lines in Fig. 1 and the plates 12 and 13 will be held against any decided movement away from each other so that the correct position of the work between the plates will be preserved while the set screw 21 is being operated to force the plates 12 and 13 more firmly upon the work. After the set screw 21 has been operated to draw the plates 12 and 13 together with the desired force the parts are allowed to remain in this state until the securing cement is firmly set to unite the patch to the inner tube.

What I claim is:—

A tool of the class described comprising a pair of arms pivotally connected at one end and terminating at their other ends in coöperating clamping plates, a yoke pivotally connected to one of said arms and embracing the other arm, the outer edge of the embracing arm having its forward and rear portions disposed in the curves of circles whose centers are between the pivot of the yoke and the inner and outer ends of said arm respectively whereby a depression is formed at the center of the outer edge of the embraced arm, and a set screw carried by the yoke and coöperating with the last named arm to force and lock said clamping plates in clamping position.

In testimony whereof, I affix my signature, in the presence of two witnesses.

WILLIAM O. SHAW.

Witnesses:
 FRANCIS BOYLE,
 GEO. H. CHANDLEE.